(12) United States Patent
Matsumura et al.

(10) Patent No.: US 11,502,720 B2
(45) Date of Patent: Nov. 15, 2022

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 110 days.

(21) Appl. No.: 16/969,763

(22) PCT Filed: Feb. 16, 2018

(86) PCT No.: PCT/JP2018/005600
§ 371 (c)(1),
(2) Date: Aug. 13, 2020

(87) PCT Pub. No.: WO2019/159343
PCT Pub. Date: Aug. 22, 2019

(65) Prior Publication Data
US 2020/0403653 A1    Dec. 24, 2020

(51) Int. Cl.
*H04B 1/7143* (2011.01)
*H04J 13/18* (2011.01)
*H04W 72/04* (2009.01)

(52) U.S. Cl.
CPC ............ *H04B 1/7143* (2013.01); *H04J 13/18* (2013.01); *H04W 72/0413* (2013.01); *H04W 72/0446* (2013.01); *H04W 72/0453* (2013.01)

(58) Field of Classification Search
CPC .. H04B 1/7143; H04J 13/18; H04W 72/0413; H04W 72/0446; H04W 72/0453
See application file for complete search history.

(56) References Cited

U.S. PATENT DOCUMENTS

| | | | |
|---|---|---|---|
| 10,412,715 B2* | 9/2019 | Noh | H04W 56/0005 |
| 2013/0121266 A1* | 5/2013 | Ko | H04L 27/2636 370/329 |
| 2013/0136071 A1* | 5/2013 | Han | H04L 27/2636 370/329 |

(Continued)

FOREIGN PATENT DOCUMENTS

| | | |
|---|---|---|
| CA | 2786700 A1 | 7/2011 |
| JP | 2013516888 A | 5/2013 |

(Continued)

OTHER PUBLICATIONS

Extended European Search Report issued in counterpart European Application No. 18906089.0 dated Aug. 27, 2021 (7 pages).

(Continued)

*Primary Examiner* — Brian D Nguyen
(74) *Attorney, Agent, or Firm* — Osha Bergman Watanabe & Burton LLP

(57) ABSTRACT

A terminal is disclosed including a processor that, if group hopping of a sequence used in an uplink control channel is enabled, determines a group number based on a slot number and a frequency hopping index; and a transmitter that transmits the uplink control channel, to which the sequence corresponding to the group number is applied. In other aspects, a radio communication method and a base station are also disclosed.

8 Claims, 11 Drawing Sheets

(56) References Cited

U.S. PATENT DOCUMENTS

| | | | |
|---|---|---|---|
| 2013/0201931 A1* | 8/2013 | Noh | H04L 5/0026 370/328 |
| 2014/0286259 A1* | 9/2014 | Han | H04W 72/02 370/329 |
| 2015/0223080 A1* | 8/2015 | Pulleti | G05D 1/0219 455/446 |
| 2015/0236883 A1* | 8/2015 | Yoon | H04L 5/0012 370/329 |
| 2016/0249355 A1 | 8/2016 | Chae et al. | |
| 2016/0380738 A1* | 12/2016 | Aiba | H04L 1/1812 370/329 |
| 2017/0134881 A1 | 5/2017 | Oh et al. | |
| 2017/0311313 A1 | 10/2017 | Park et al. | |
| 2019/0349987 A1* | 11/2019 | Lee | H04L 1/00 |
| 2020/0274630 A1* | 8/2020 | Liang | H04L 25/03178 |
| 2020/0366334 A1* | 11/2020 | Li | H04L 5/0012 |

FOREIGN PATENT DOCUMENTS

| | | |
|---|---|---|
| JP | 2017501610 A | 1/2017 |
| WO | 2013125840 A1 | 8/2013 |

OTHER PUBLICATIONS

Qualcomm Incorporated; "WF on NB-IoT UL DMRS Hopping"; 3GPP TSG RAN Meeting #85, R1-165788; Nanjing, China; May 23-27, 2016 (1 page).

NTT Docomo, Inc.; "Sequence-based PUCCH vs DMRS-based PUCCH"; 3GPP TSG RAN WG1 Meeting #88bis, R1-1705739; Spokane, USA, Apr. 3-7, 2017 (9 pages).

Panasonic; "Frequency-hopping details of long-PUCCH"; 3GPP TSG RAN WG1 Meeting #91, R1-1720448; Reno, USA, Nov. 27-Dec. 1, 2017 (3 pages).

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).

International Search Report issued in International Application No. PCT/JP2018/005600, dated May 1, 2018 (5 pages).

Written Opinion issued in International Application No. PCT/JP2018/005600; dated May 1, 2018 (3 pages).

Office Action issued in African Application No. AP/P/2020/012606 dated Apr. 22, 2022 (5 pages).

Office Action issued in Indian Application No. 202037039546; dated Jun. 20, 2022 (7 pages).

* cited by examiner

| PUCCH FORMAT | NUMBER OF SYMBOLS | NUMBER OF BITS |
|---|---|---|
| 0 | 1-2 | ≤2 |
| 1 | 4-14 | ≤2 |
| 2 | 1-2 | >2 |
| 3 | 4-14 | >N |
| 4 | 4-14 | >2, <N |

FIG. 2

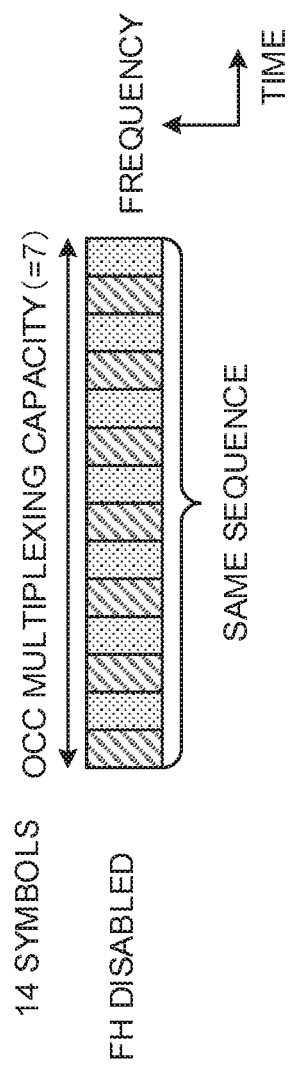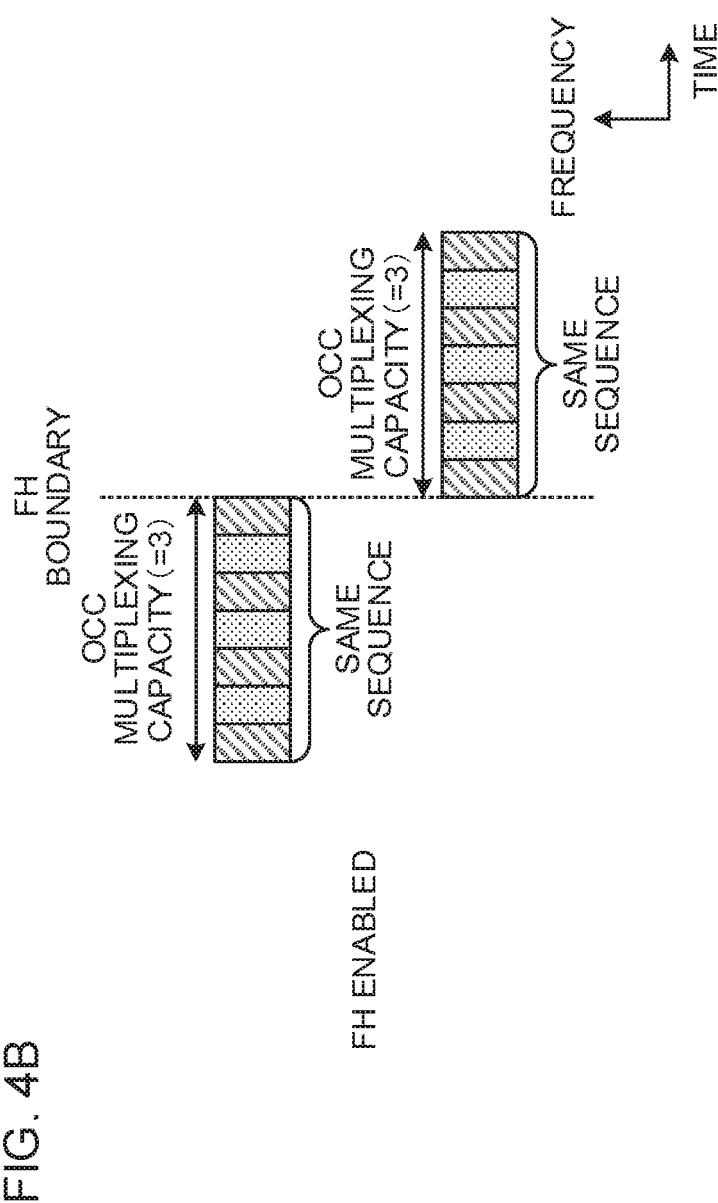
FIG. 4A
FIG. 4B

USER TERMINAL AND RADIO COMMUNICATION METHOD

TECHNICAL FIELD

The present invention relates to a user terminal and a radio communication method in the next-generation mobile communication system.

BACKGROUND ART

In the UMTS (Universal Mobile Telecommunications System) network, the specification of Long Term Evolution (LTE) has been drafted for the purpose of further increasing a high speed data rate, providing lower latency, and so on (see Non-Patent Literature 1). In addition, successor systems of LTE are also under study for the purpose of achieving further broadbandization and increased speed beyond LTE (for example, referred to as "LTE-A (LTE-Advanced)," "FRA (Future Radio Access)," "4G," "5G," "5G+(plus)," "NR (New RAT)," "LTE Rel. 14," "LTE Rel. 15 (or later versions)," and so on).

In the existing LTE systems (for example, LTE Rel. 8 to Rel. 13), downlink (DL) and/or uplink (UL) communication is performed by using a subframe of 1 ms (also referred to as a transmission time interval (TTI) or the like). The subframe is a transmission time unit of one data packet coded by channel coding and is a processing unit of scheduling, link adaptation, retransmission control (HARQ (Hybrid Automatic Repeat reQuest)), or the like.

In the existing LTE systems (for example, LTE Rel. 8 to Rel. 13), a user terminal transmits uplink control information (UCI) by using an uplink control channel (such as PUCCH (Physical Uplink Control Channel)) or an uplink data channel (such as PUSCH (Physical Uplink Shared Channel)). The format of the uplink control channel is referred to as a PUCCH format (PF) or the like.

In the existing LTE systems, the user terminal multiplexes and transmits the UL channel and the DMRS within a TTI of 1 ms. Within a TTI of 1 ms, a plurality of DMRSs of different layers of the same user terminal (or different user terminals) are orthogonally multiplexed using cyclic shift (CS) and/or orthogonal spreading codes (orthogonal cover code (OCC)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In the existing LTE systems (for example, LTE Rel. 13 or earlier versions), inter-cell interference is alleviated by hopping a UL channel DMRS reference sequence (DMRS sequence) at every two slots included in a subframe of 1 ms (for example, sequence group hopping (SGH, also simply referred to as "group hopping"), sequential hopping, and the like).

For the future radio communication systems (such as LTE Rel. 14, Rel. 15, or later versions, 5G, and NR), study has been made for supporting a first uplink control channel having a relatively short duration (such as one or two symbols) (also referred to as "short PUCCH", "PUCCH format 0 or 2", or the like) and a second uplink control channel having a duration longer than that of the first uplink control channel (such as four to fourteen symbols) (also referred to as "long PUCCH", "PUCCH format 1, 3, or 4", or the like).

In the future radio communication systems, it is assumed that an allocation duration of the uplink control channel (such as "long PUCCH") and/or a start symbol in a certain slot is flexibly set. For example, it is assumed that the UL transmission of each UE is supported using uplink control channels having different durations and/or start symbols for each slot. In addition, in the future radio communication systems, study has been made for controlling whether or not the frequency hopping is enabled in a slot.

In this manner, in the future radio communication systems in which communication is controlled using durations and/or start symbols different from those of the existing LTE systems, how to control the sequence (or hopping of the sequence) applied to the DMRS and/or PUCCH is problematic.

In view of the aforementioned problems, it is therefore an object of the present invention to provide a user terminal and a radio communication method, capable of suitably configuring a sequence applied to a reference signal, an uplink control channel, and/or the like in the future radio communication system.

Solution to Problem

According to an aspect of the present invention, there is provided a user terminal including: a transmitting section that transmits a demodulation reference signal and/or an uplink control channel to which a certain sequence is applied in a certain slot; and a control section that selects at least one of a certain sequence applied when frequency hopping is configured and a certain sequence applied when the frequency hopping is not configured out of a plurality of certain sequences obtained on the basis of at least a frequency hopping index in each slot.

Advantageous Effects of Invention

According to the present invention, it is possible to suitably configure a sequence applied to a reference signal, an uplink control channel, and/or the like in future radio communication systems.

BRIEF DESCRIPTION OF DRAWINGS

FIG. 2 is a diagram to show an example of a PUCCH format in the future radio communication system;

FIGS. 4A and 4B are diagrams to describe a relationship between the OCC multiplexing capacity and the applied sequence;

DESCRIPTION OF EMBODIMENTS

Figure 1A:
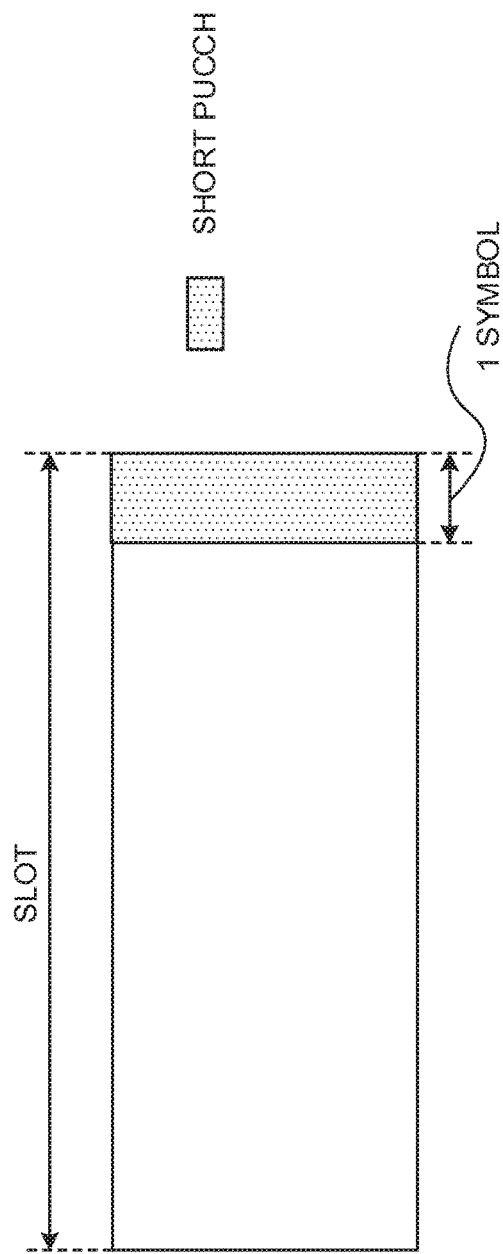
FIGS. 1A and 1B are diagrams to show an example of configuration of an uplink control channel in a future radio communication system.

In the existing LTE systems (for example, LTE Rel. 13 or earlier versions), two slots are provided within a TTI of 1 ms. In addition, the DMRS used in the PUSCH demodulation is arranged in one symbol of each slot (two symbols within a TTI of 1 ms). As a reference sequence of the DMRS (also referred to as "DMRS sequence" or the like), for example, a sequence based on Zadoff-chu (ZC) is employed.

In the existing LTE systems, the number of DMRS sequences is set to "30" or "60" depending on a bandwidth. For example, the number of DMRS sequences is "30" when the bandwidth is equal to or narrower than five PRBs (Physical Resource Block, also referred to as a resource block (RB) or the like). The number of DMRS sequences is "60" when the bandwidth is equal to or wider than six PRBs.

In the existing LTE systems, when the bandwidth is equal to or narrower than five PRBs, 30 DMRS sequences are identified by group numbers (u=0 to 29, also referred to as "group index" or the like). In addition, when the bandwidth is equal to or wider than six PRBs, 60 DMRS sequences are identified by the group number (u=0 to 29) and the base sequence number (v=0 or 1, also referred to as "sequence index" or the like).

When the same DMRS sequence is used between a plurality of user terminals in different cells, transmission signals from the plurality of user terminals interfere with each other. In this regard, in order to avoid the DMRS sequences from being equal to each other successively between the plurality of user terminals, the DMRS sequence is hopped at every slot within a TTI of 1 ms. For example, in the existing LTE systems, two types of hopping schemes (sequence group hopping and sequence hopping) are employed.

In the sequence group hopping (SGH, also simply referred to as "group hopping"), the group number (u) described above is hopped on a slot basis within a TTI of 1 ms. In the SGH, the group number (u) of each slot is determined on the basis of the hopping pattern ($f_{gh}$) and the sequence shift pattern ($f_{ss}$). The hopping pattern and/or sequence shift pattern may be based on a physical cell ID (cell ID) or a virtual cell ID. The user terminal may identify the physical cell ID from the sequence number of a synchronization signal (PSS/SSS) and may identify the virtual cell ID by using the RRC signaling. Note that, in the existing LTE systems, for example, seventeen hopping patterns and thirty sequence shift patterns are employed.

Meanwhile, in the sequence hopping, the base sequence number (v) described above is hopped on a slot basis within one TTI. The base sequence number (v) of each slot is determined on the basis of the physical cell ID or the virtual cell ID. The sequence hopping is enabled when the bandwidth is equal to or wider than six PRBs. The sequence hopping is not enabled simultaneously with the SGH (when the SGH is enabled, v is configured to zero: "v=0").

As described above, in the existing LTE systems, in order to randomize inter-cell interference, the SGH or the sequence hopping may be applied to the DMRS sequence.

In the future radio communication systems (such as LTE Rel. 15 or later versions, 5G, and NR), study has been made for transmitting the UCI by using the uplink control channel (such as PUCCH) of a plurality of formats having at least different durations (for example, NR PUCCH format (NR PF), also simply referred to as "PUCCH format").

Figure 1B:
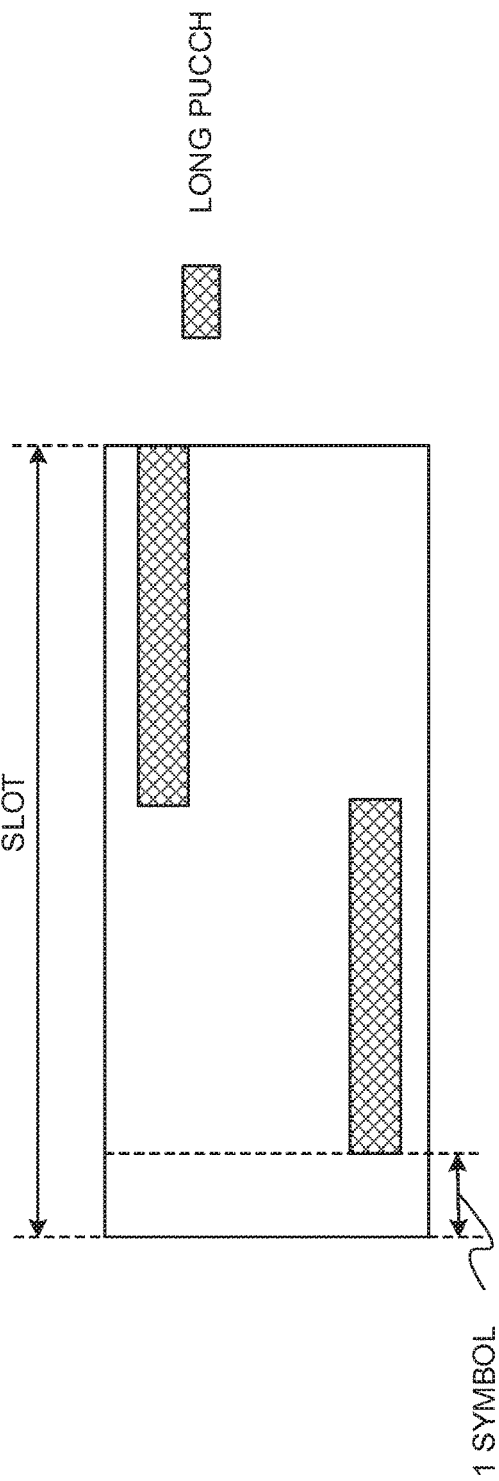

FIG. 1 is a diagram to show an example of a PUCCH in the future radio communication system. In FIG. 1A, a PUCCH (short PUCCH or first uplink control channel) consisting of a relatively smaller number of symbols (duration such as one to two symbols) is illustrated. In FIG. 1B, a PUCCH (long PUCCH or second uplink control channel) consisting of a larger number of symbols (duration such as four to fourteen symbols) than the number of the short PUCCHs is illustrated.

As illustrated in FIG. 1A, the short PUCCH may be arranged in a certain number of symbols (for example, one to two symbols) from the end of the slot. Note that the symbol where the short PUCCH is arranged is not limited to the end of the slot, but may be a certain number of symbols arranged at the start of the slot or in the middle of the slot. Furthermore, the short PUCCH is arranged in one or more frequency resources (for example, one or more PRBs). Note that, although it is assumed that the short PUCCH is arranged in successive PRBs in FIG. 1A, it may also be arranged in non-successive PRBs.

The short PUCCH may be time-division-multiplexed and/or frequency-division-multiplexed with the uplink data channel (hereinafter, also referred to as "PUSCH") in a slot. In addition, the short PUCCH may be time-division-multiplexed and/or frequency-division-multiplexed with the downlink data channel (hereinafter, also referred to as "PDSCH") and/or the downlink control channel (hereinafter, also referred to as "PDCCH (Physical Downlink Control Channel)") in a slot.

For the short PUCCH, a multi-carrier waveform (for example, an OFDM (Orthogonal Frequency Division Multiplexing) waveform) or a single-carrier waveform (for example, a DFT-s-OFDM (Discrete Fourier Transform-Spread-Orthogonal Frequency Division Multiplexing) waveform) may be employed.

Meanwhile, as illustrated in FIG. 1B, the long PUCCH is arranged across a plurality of symbols (for example, four to fourteen symbols) more than the number of the short PUCCH. In FIG. 1B, the long PUCCH is not arranged in a certain number of symbols at the start of the slot, but the long PUCCH may be arranged in a certain number of symbols at the start of the slot.

As illustrated in FIG. 1B, in order to obtain a power boosting effect, the long PUCCH may include a smaller number frequency resources (for example, one or two PRBs) than that of the short PUCCH or may include the same number of frequency resources as that of the short PUCCH.

The long PUCCH may be frequency-division-multiplexed with the PUSCH in a slot. In addition, the long PUCCH may be time-division-multiplexed with the PDCCH in a slot.

Furthermore, the long PUCCH may be arranged in the same slot as that of the short PUCCH. In the long PUCCH, a single carrier waveform (such as a DFT-s-OFDM waveform) or a multi-carrier waveform (such as an OFDM waveform) may be employed.

As illustrated in FIG. 1B, frequency hopping in which the frequency resources are hopped at a certain timing within a slot may be applied to the long PUCCH. In the long PUCCH, the hopping timing of the frequency resource may also be referred to as "hopping boundary", "hopping timing", "hopping pattern", or the like.

FIG. 2 is a diagram to show an example of a PUCCH format in the future radio communication system. In FIG. 2, a plurality of PUCCH formats (NR PUCCH formats) having a different number of symbols and/or a different number of bits of the UCI are illustrated. Note that the PUCCH format of FIG. 2 is merely for illustrative purposes, and the contents, the numbering, and the like of PUCCH formats 0 to 4 are not limited to those illustrated in FIG. 2.

For example, in FIG. 2, PUCCH format 0 is a short PUCCH for UCI having up to two bits and is also referred to as "sequence-based short PUCCH" or the like. The short PUCCH transmits (conveys) the UCI of up to two bits (for example, HARQ-ACK and/or SR) using one or two symbols.

PUCCH format 1 is a long PUCCH for UCI having up to two bits. The long PUCCH transmits the UCI of up to two bits by using four to fourteen symbols. In PUCCH format 1, a plurality of user terminals may be multiplexed by code division multiplexing (CDM) within the same PRB, for example, using cyclic shift (CS) and/or time-domain block-wise spreading based on the orthogonal spreading codes (OCC (Orthogonal Cover Code)).

The PUCCH format 2 is a short PUCCH for the UCI more than two bits. The short PUCCH transmits the UCI more than two bits by using one or two symbols.

PUCCH format 3 is a long PUCCH for the UCI more than "N" bits, and a single user terminal is multiplexed within the same PRB. The number "N" may be set to a certain value (for example, "2"). The long PUCCH transmits the UCI more than "N" bits (or equal to or greater than "N" bits) by using four to fourteen symbols. PUCCH format 3 is different from following PUCCH format 4 in that a plurality of user terminals are not multiplexed within the same PRB. In addition, in PUCCH format 3, the OCC may be applied before the DFT spreading.

PUCCH format 4 is a long PUCCH for the UCI more than two bits, and a plurality of user terminals can be multiplexed within the same PRB. The long PUCCH transmits the UCI more than two bits and smaller than "N" bits (or equal to or smaller than "N" bits) by using four to fourteen symbols. In PUCCH format 4, a plurality of user terminals may be code-division-multiplexed within the same PRB through time-domain block spreading based on the CS and/or the OCC. Alternatively, a plurality of user terminals may be multiplexed using at least one of block spreading (of the frequency domain) prior to the discrete Fourier transform (DFT), frequency division multiplexing (FDM), and comb-toothed subcarriers (Comb). In addition, the OCC prior to DFT spreading may not be applied to PUCCH format 4.

Note that the threshold "N" of the number of bits of the UCI may be set to any integer greater than "3" (or equal to or greater than "3"). The threshold may be defined in the specification or may be configured by the higher layer signaling (for example, at least one of RRC (Radio Resource Control) signaling, broadcast information (such as MIB (Master Information Block)), and system information (such as SIB (System Information Block) or RMSI (Remaining Minimum System Information)). Alternatively, the threshold "N" may not be defined.

PUCCH format 4 is different from PUCCH format 3 in that a plurality of user terminals can be multiplexed within the same PRB. Note that PUCCH format 3 and PUCCH format 4 may be defined interchangeably or may be defined as the same PUCCH format (for example, PUCCH format 3).

Note that, in FIG. 2, different values of "N" may be used in PUCCH format 3 and PUCCH format 4. For example, "N=2" may be used in PUCCH format 3, and "N=100" may be used in PUCCH format 4. The PUCCH format applicable to the present embodiment is not limited to those illustrated in FIG. 2.

Figures 3A, 3B:
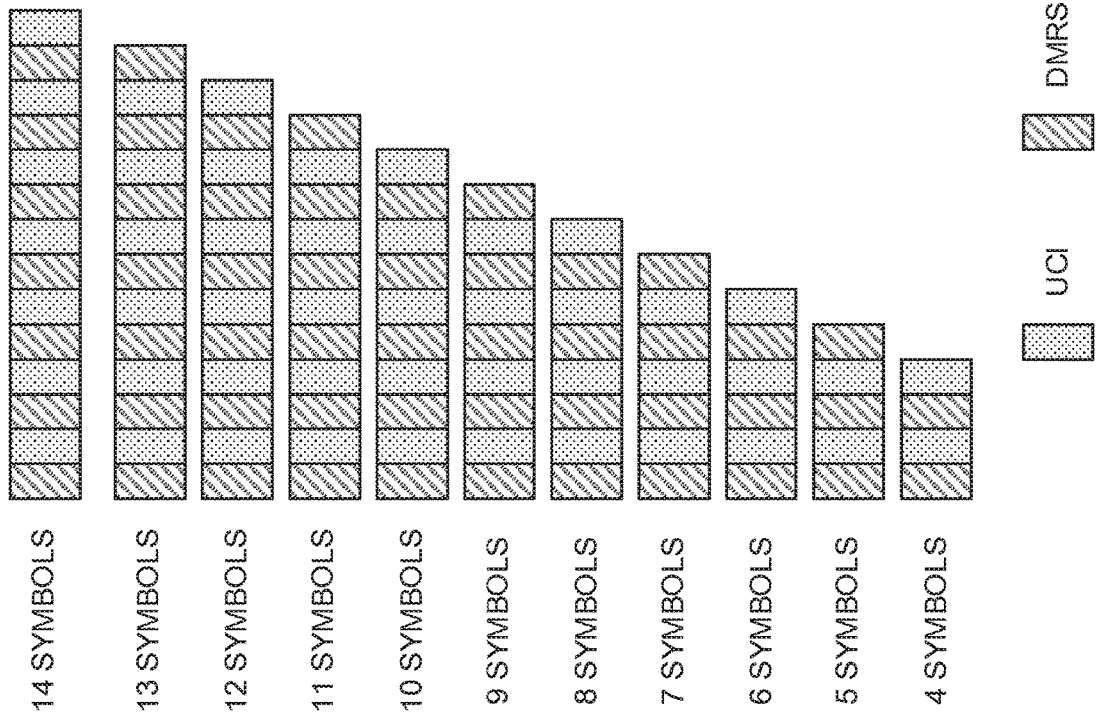
FIGS. 3A and 3B are diagrams to show an example of the duration of the long PUCCH and an example of the OCC multiplexing capacity for each duration.

In the future radio communication systems, it is assumed that an allocation duration and/or a start symbol of the uplink control channel (such as long PUCCH) in a certain slot is flexibly configured (see FIG. 3A). FIG. 3A illustrates a case where the allocation duration (symbol) of the PUCCH is configured to "4" to "14". Note that the locations, the ratios, and/or the like of the DMRS symbols and the UCI symbols are not limited to those illustrated in FIG. 3A.

In the future radio communication systems, the number of user terminals multiplexed by the OCC is determined depending on the duration of the long PUCCH (Long-PUCCH duration) (for example, PF1 that transmits the UCI up to two bits). The number of the user terminals multiplexed by the time-domain OCC may also be referred to as "OCC multiplexing capacity", "OCC length", "spreading factor (SF)", or the like.

FIG. 3B is a diagram to show an example of an OCC multiplexing capacity for each long PUCCH duration. As illustrated in FIG. 3B, the OCC multiplexing capacity M for each long PUCCH duration may be defined to different values depending on whether or not the frequency hopping is enabled within the long PUCCH duration. For example, when the long PUCCH duration N is fourteen symbols, and the frequency hopping is enabled in FIG. 3B, the OCC multiplexing capacity is "3". In addition, when the frequency hopping is not enabled, the OCC multiplexing capacity is "7".

When multiplexing of the UE is performed using the cyclic shift (CS) in addition to the OCC, the maximum value of the multiplexing capacity for a certain resource is "(maximum value of OCC capacity)×(CS number)". The CS number may be set to a certain value (for example, 12).

When the OCC in the time domain is applied to the PUCCH (for example, PF1), it is necessary to set the same reference sequence within the same OCC length range (to apply the same reference sequence) in order to maintain orthogonality. Note that different values may be used for the cyclic shift applied to the reference sequence.

For example, when the PUCCH duration consists of fourteen symbols, and the frequency hopping is disabled, the OCC multiplexing capacity (OCC length) is "7" (see FIG. 3B). In this case, it is necessary to apply the same reference sequence to the PUCCH to which the OCC multiplexing capacity of "7" is applied (PUCCH UCI symbol and/or PUCCH DMRS symbol) (see FIG. 4A).

Meanwhile, when the PUCCH duration consists of fourteen symbols, and the frequency hopping is enabled, the OCC multiplexing capacity (OCC length) is "3" (see FIG. 3B). In this case, it is necessary to apply the same reference sequence to the PUCCH for a first half of the frequency hopping to which the OCC multiplexing capacity of "3" is applied and to apply the same reference sequence to the PUCCH for a second half of the frequency hopping (see FIG. 4B).

In the existing LTE systems, the PUCCH frequency hopping is performed for each slot (on a slot basis). However, in the future radio communication systems, it is assumed that the frequency hopping is also performed within a slot. In this case, how to control generation of the reference sequence is problematic.

In this regard, according to an aspect of the present invention, the inventors came up with an idea that a certain sequence (for example, the number of certain sequences) applied in a certain slot is controlled individually in consideration of whether or not the frequency hopping is configured in a certain slot. For example, the inventors came up with an idea that at least one of a certain sequence applied when the frequency hopping is configured or a certain sequence applied when the frequency hopping is not configured is selected from a plurality of certain sequences obtained at least on the basis of the frequency hopping index in each slot.

Embodiments of the present invention will now be described in details. The embodiments described below may be applied alone or in combination. According to the present embodiment, a certain sequence may be used in at least one of the UCI symbol of PUCCH (such as long PUCCH), the DMRS symbol of PUCCH (such as long PUCCH), the reference sequence (base sequence) for PUCCH (such as short PUCCH), and the DMRS for PUSCH. Naturally, the certain sequence may also be applied to sequences of other signals and/or channels. In addition, the certain sequence may also be referred to as "reference sequence (base sequence)", "reference signal sequence", or "demodulation reference signal sequence".

According to the present embodiment, hopping of a certain sequence may be hopping of the group number of the certain sequence (also referred to as "sequence group hopping (SGH)", "group hopping", or the like) and/or hopping of the base sequence number of the certain sequence (also referred to as "sequence hopping" or the like). In addition, the hopping of the certain sequence is not limited to the SGH and/or the sequence hopping described above as long as different certain sequences are used for each certain duration (such as "sTTI").

According to the present embodiment, the certain sequence may be identified by the group number and/or the base sequence number. In the following description, the method of generating the reference sequence (or DMRS sequence) in the existing LTE system (such as formulas) may be applied to generation of the certain sequence or the like unless specified otherwise.

(First Aspect)

According to a first aspect, a case where a certain sequence applied in a certain slot (such as the number of certain sequences) is individually controlled in consideration of whether or not frequency hopping (FH) for the certain slot is enabled will be described.

Specifically, in a certain slot, control is performed such that the number of certain sequences applied to transmit the PUCCH or the like (such as "hopping pattern ($f_{gh}$)") when frequency hopping (such as PUCCH-frequency-hopping) is disabled is configured to be smaller than the number of certain sequences applied to transmit the PUCCH or the like when the frequency hopping is enabled.

For example, the number of certain sequences applied when the frequency hopping is enabled in one slot is set to "N1" (for example, two), and the number of certain sequences applied when the frequency hopping is disabled is set to "N2" (for example, one). In addition, a part of the certain sequences (for example, one sequence) applied when the frequency hopping is enabled is used as the certain sequence applied when the frequency hopping is disabled.

Figure 5A:
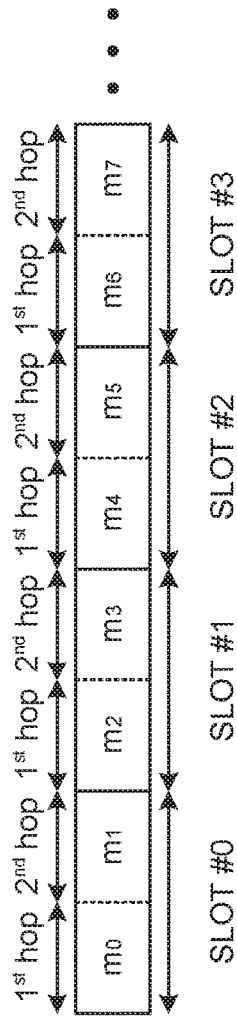
FIGS. 5A and 5B are diagrams to show an example of a certain sequence in the present embodiment.

FIG. 5 illustrates an example of a certain sequence applied for PUCCH transmission in each slot. FIG. 5A illustrates a case where a certain sequence index (for example, base sequence index) is configured in each slot on the basis of a frequency hopping level (here, "2"). More specifically, certain sequence indices are configured for the $1^{st}$ hop and the $2^{nd}$ hop included in each slot.

The certain sequence indices of the $1^{st}$ hop and the $2^{nd}$ hop may be calculated on the basis of indices of each frequency hopping of the PUCCH in addition to the slot indices.

In FIG. 5A, the certain sequence index of the $1^{st}$ hop of the slot #0 is "$m_0$", and the certain sequence index of the $2^{nd}$ hop of the slot #0 is "$m_1$". The certain sequence index of the $1^{st}$ hop of the slot #1 is "$m_2$", and the certain sequence index of the $2^{nd}$ hop of the slot #1 is "$m_3$". In addition, the certain sequence index of the $1^{st}$ hop of the slot #2 is "$m_4$", and the certain sequence index of the $2^{nd}$ hop of the slot #2 is "$m_5$". The certain sequence index of the $1^{st}$ hop of the slot #3 is "$m_6$", and the certain sequence index of the $2^{nd}$ hop of the slot #3 is "$m_7$". Note that the reference sequence indices of each slot are exemplary and are not limited thereto.

Figure 5B:
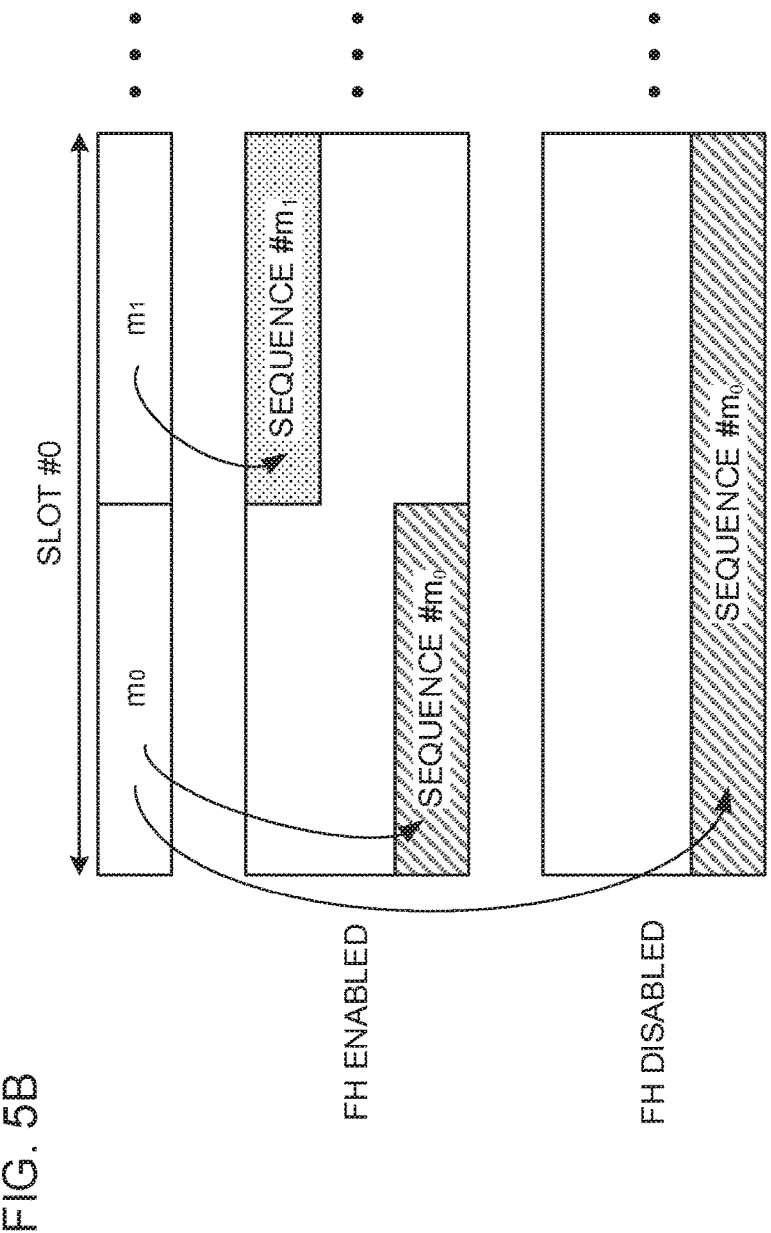

FIG. 5B illustrates an example of a method of selecting the index of the certain sequence applied to UL transmission (such as PUCCH and/or DMRS transmission) in each slot on the basis of whether or not the frequency hopping is enabled.

When the frequency hopping is enabled, the certain sequence index of the $1^{st}$ hop calculated for each slot is applied to UL transmission that uses the frequency of the $1^{st}$ hop for transmission, and the certain sequence index of the $2^{nd}$ hop is applied to UL transmission that uses the frequency of the $2^{nd}$ hop for transmission. An indication for enabling the frequency hopping ("enabled") may be notified from a base station to a UE by using higher layer signaling (PUCCH frequency hopping).

The indication for enabling the frequency hopping ("enabled") may be performed using all or a part of the higher layer signaling (PUCCH-frequency-hopping, PUCCH-starting-PRB, and PUCCH-2nd-hop-PRB). For example, the UE may assume that the indication for enabling the frequency hopping is issued when "PUCCH-frequency-hopping=enable" and "PUCCH-starting-PRB≠PUCCH-2nd-hop-PRB". Alternatively, the UE may assume that the indication for enabling the frequency hopping is issued when "PUCCH-starting-PRB≠PUCCH-2nd-hop-PRB".

For example, in FIG. 5B, for the slot #0, the certain sequence index "$m_0$" of the $1^{st}$ hop is applied to UL transmission that uses the frequency of the $1^{st}$ hop for transmission, and the certain sequence index "$m_1$" of the $2^{nd}$ hop is applied UL transmission that uses the frequency of the $2^{nd}$ hop for transmission. That is, when the frequency hopping is enabled, a plurality of (for example, two) certain sequence indices calculated for each slot are applied.

When the frequency hopping is disabled, one of the certain sequence indices (for example, $1^{st}$ hop) calculated for each slot is applied to UL transmission in which the frequency hopping is not performed. The indication for disabling the frequency hopping ("disabled") may be notified from a base station to a UE by using higher layer signaling (PUCCH-frequency-hopping).

The indication for disabling the frequency hopping ("disabled") may be performed using all or a part of higher layer signaling (PUCCH-frequency-hopping, PUCCH-starting- PRB, and PUCCH-2nd-hop-PRB). For example, the UE may assume that the indication for disabling the frequency hopping is issued when "PUCCH-frequency-hopping=disable" and "PUCCH-starting-PRB=PUCCH-2nd-hop-PRB". Alternatively, the UE may assume that the indication for disabling the frequency hopping is issued when "PUCCH-starting-PRB=PUCCH-2nd-hop-PRB".

For example, in FIG. 5B, for the slot #0, the certain sequence index "$m_0$" of the $1^{st}$ hop is applied to UL transmission in which the frequency hopping is not performed. That is, when the frequency hopping is disabled, one certain sequence index selected from a plurality of (for example, two) certain sequence indices calculated for each slot is applied.

When the frequency hopping is disabled, the method of selecting the certain sequence index of the $1^{st}$ or $2^{nd}$ hop calculated for each slot may be determined on the basis of a cell-specific value (such as "cell ID" or "virtual cell ID"). As a result, it is possible to use the same sequence index for the UEs within a cell when the frequency hopping is disabled, and to simplify adjustment/design of the inter-cell interference.

When the frequency hopping is disabled, the method of selecting the certain sequence index of the $1^{st}$ or $2^{nd}$ hop calculated for each slot may be determined on the basis of the UE-specific value (such as UE ID, RNTI, and a value notified using higher layer/physical layer signaling). As a result, it is possible to randomize the sequence index used by each UE within a cell when the frequency hopping is disabled. In addition, without sufficiently considering cell design or station design, it is possible to use a sequence in which inter-cell interference is reduced to some extent.

In this manner, the certain sequences of the $1^{st}$ and $2^{nd}$ hops are calculated on the basis of the indices of each frequency hop in the UL transmission (for example, PUCCH) in addition to the slot index. In addition, one or both of the certain sequences of the $1^{st}$ and $2^{nd}$ hops are applied on the basis of whether or not the frequency hopping is enabled. As a result, it is possible to flexibly configure the certain sequence to be applied depending on whether or not a slot is enabled even when the frequency hopping is enabled within the slot (or when whether or not the frequency hopping is enabled in a slot is changed).

(Second Aspect)

According to a second aspect, an example of a method of determining the certain sequence will be described. In the following description, the group hopping (sequence group hopping (SGH)) and the sequence hopping will be described. Note that the method of determining the certain sequence described below may be suitably employed in the certain sequence of the first aspect.

In the group hopping, a group number (u) of a certain group can be determined on the basis of the hopping pattern ($f_{gh}$) and the sequence shift pattern ($f_{ss}$). The sequence hopping can be determined on the basis of the base sequence number (v) corresponding to the certain group. The certain group may be set from the base station to the UE on the basis of the higher layer signaling (such as "PUCCH-GroupHopping").

The group number (u) may be determined on the basis of the following Formula (1) based on the hopping pattern ($f_{gh}$) and the sequence shift pattern ($f_{ss}$).

$$u=(f_{gh}+f_{ss}) \bmod 30 \quad \text{Formula (1)}$$

The certain sequence may be determined on the basis of the hopping pattern ($f_{gh}$), the sequence shift pattern ($f_{ss}$), and the base sequence number (v) defined individually from the condition of the group hopping (PUCCH-GroupHopping). The condition of the group hopping pattern may be notified from the base station to the UE by using downlink control information and/or higher layer signaling.

In the following description, an example of the hopping pattern ($f_{gh}$), the sequence shift pattern ($f_{ss}$), and the base sequence number (v) depending on the condition of the group hopping will be described.

<Group Hopping Condition 1>

When the group hopping satisfies a first condition (for example, "PUCCH-GroupHopping" is "neither"), the hopping pattern ($f_{gh}$), the sequence shift pattern ($f_{ss}$), and the base sequence number (v) may be determined on the basis of the following Formula (2).

$$f_{gh}=0\, f_{ss}=n_{ID} \bmod 30 \quad v=0 \quad \text{Formula (2)}$$

"$n_{ID}$" is a certain index and is defined in a specification, for example, using a parameter relating to the cell ID or the like in advance.

When the group hopping satisfies the first condition (for example, "PUCCH-GroupHopping" is "neither"), the hopping pattern ($f_{gh}$) and the base sequence number (v) is zero. Therefore, the certain sequence may be generated on the basis of the sequence shift pattern ($f_{ss}$).

<Group Hopping Condition 2>

When the group hopping satisfies a second condition (for example, "PUCCH-GroupHopping" is "enabled"), the hopping pattern ($f_{gh}$), the sequence shift pattern ($f_{ss}$), and the base sequence number (v) may be determined on the basis of the following Formula (3).

$$f_{gh}=(\Sigma_{m=0}^{7} 2^m c(8(2n_s^\mu + n_{hop})+m)) \bmod 30 \quad f_{ss}=n_{ID} \bmod 30 \quad v=0 \quad \text{Formula (3)}$$

"c(i)" is a pseudo random sequence and is defined in a specification using a certain parameter in advance. The generation of the pseudo random sequence is initialized using "$c_{init}$". For example, "$c_{init}$" is defined in the following Formula (4), and initialization (or reset) is performed using "$c_{init}$" at every certain duration (for example, 10 ms).

$$c_{init}=\lfloor n_{ID}/30 \rfloor \quad \text{Formula (4)}$$

"$n_s^\mu$" is a parameter relating to a slot index (for example, slot index value).

"$n_{hop}$" corresponds to an index of the frequency hopping in each slot and is selected from certain values (for example, {0, 1}). In addition, "$n_{hop}$" may be determined on the basis of whether or not the frequency hopping (PUCCH-frequency-hopping) is enabled. For example, it may be determined on the basis of the following Formula (5).

$$n_{hop}=0 \text{ if PUCCH-frequency-hopping=disabled}$$

$$n_{hop}=0 \text{ if PUCCH-frequency-hopping=enabled, and if } 1^{st} \text{ frequency hopping}$$

$$n_{hop}=1 \text{ if PUCCH-frequency-hopping=enabled, and if } 2^{nd} \text{ frequency hopping} \quad \text{Formula (5)}$$

In Formula (5), when the frequency hopping is disenabled (PUCCH-frequency-hopping=disabled), "$n_{hop}=0$" is selected. Note that configuring "disabled" of the frequency hopping may be notified from the base station to the UE by using the higher layer signaling (PUCCH-frequency-hopping).

When the frequency hopping is enabled (PUCCH-frequency-hopping=enabled), "$n_{hop}=0$" is selected at the first frequency hopping ($1^{st}$ hop). In addition, when the frequency hopping is enabled (PUCCH-frequency-hopping=enabled), "$n_{hop}=1$" is selected at the second frequency hopping ($2^{nd}$ hop). Note that configuring "enabled" of the frequency hopping may be notified from the base station to the UE by using the higher layer signaling (PUCCH-frequency-hopping).

That is, when the frequency hopping is enabled, two hopping patterns ($f_{gh}$) is configured in one slot. Meanwhile, when the frequency hopping is disabled, one hopping pattern ($f_{gh}$) is configured in one slot, so that the one hopping pattern ($f_{gh}$) has the same value as that of the $1^{st}$ hop applied when the frequency hopping is enabled (see FIG. 5B described above).

Alternatively, when the frequency hopping is enabled (PUCCH-frequency-hopping=enabled), the value of "$n_{hop}$" (0 or 1) may be selected on the basis of the symbol index of the slot. For example, for UL transmission having a symbol index of the slot smaller than "floor(N/2)", "$n_{hop}=0$" may be selected and applied. Meanwhile, for UL transmission having a symbol index of the slot equal to or larger than "floor(N/2)", "$n_{hop}=1$" may be selected and applied. Note that "N" may be the number of symbols allocated to the PUCCH. As a result, it is possible to determine whether the frequency hopping is the $1^{st}$ hop or the $2^{nd}$ hop on the basis of the number of symbols allocated to the PUCCH.

<Group Hopping Condition 3>

When the group hopping satisfies a third condition (for example, "PUCCH-GroupHopping" is "disabled"), the hopping pattern ($f_{gh}$), the sequence shift pattern (f), and the base sequence number (v) may be determined on the basis of the following Formula (6).

$$f_{gh}=0 f_{ss}=n_{ID} \bmod 30 v=c(n_s^\mu) \quad \text{Formula (6)}$$

"c(i)" is a pseudo random sequence and is defined in a specification using a certain parameter in advance. The generation of the pseudo random sequence is initialized with the "$c_{init}$". For example, the "$c_{init}$" is defined in the following Formula (7), and initialization (or reset) is performed using the "$c_{init}$" at every certain duration (for example, 10 ms). Note that the "$c_{init}$" may also be defined in Formula (4) as described above.

$$c_{init}=2^5 \lfloor n_{ID}/30 \rfloor +(n_{ID} \bmod 30) \quad \text{Formula (7)}$$

When the group hopping satisfies a third condition (for example, "PUCCH-GroupHopping" is "disabled"), the hopping pattern ($f_{gh}$) is zero. Therefore, the certain sequence may be generated on the basis of the sequence shift pattern ($f_{ss}$) and the base sequence number (v).

(Radio Communication System)

Hereinafter, a structure of a radio communication system according to one embodiment of the present invention will be described. In this radio communication system, the radio communication method according to each embodiment of the present invention described above may be used alone or may be used in combination for communication.

Figure 6:
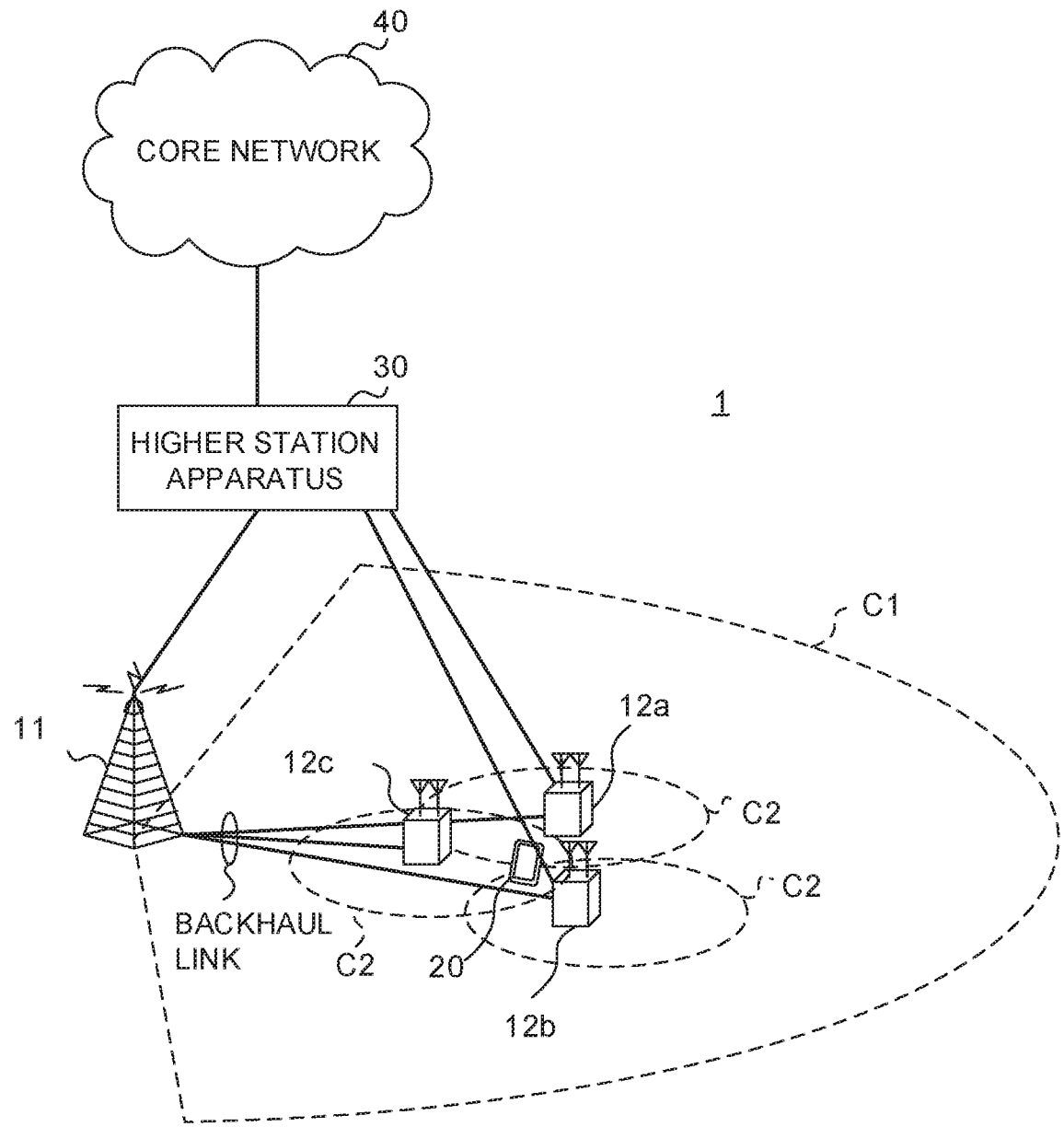
FIG. 6 is a diagram to show an example of a schematic structure of a radio communication system according to the present embodiment.

FIG. 6 is a diagram to show an example of a schematic structure of the radio communication system according to one embodiment of the present invention. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 may adopt CA or DC by using a plurality of cells (CCs) (for example, five or less CCs, or six or more CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands including one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including PDSCH and/or PUSCH scheduling information, and so on are communicated on the PDCCH.

Note that the scheduling information may be reported by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Delivery confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio quality information (CQI (Channel Quality Indicator)) of the downlink, delivery confirmation information, a scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

<Radio Base Station>

Figure 7:
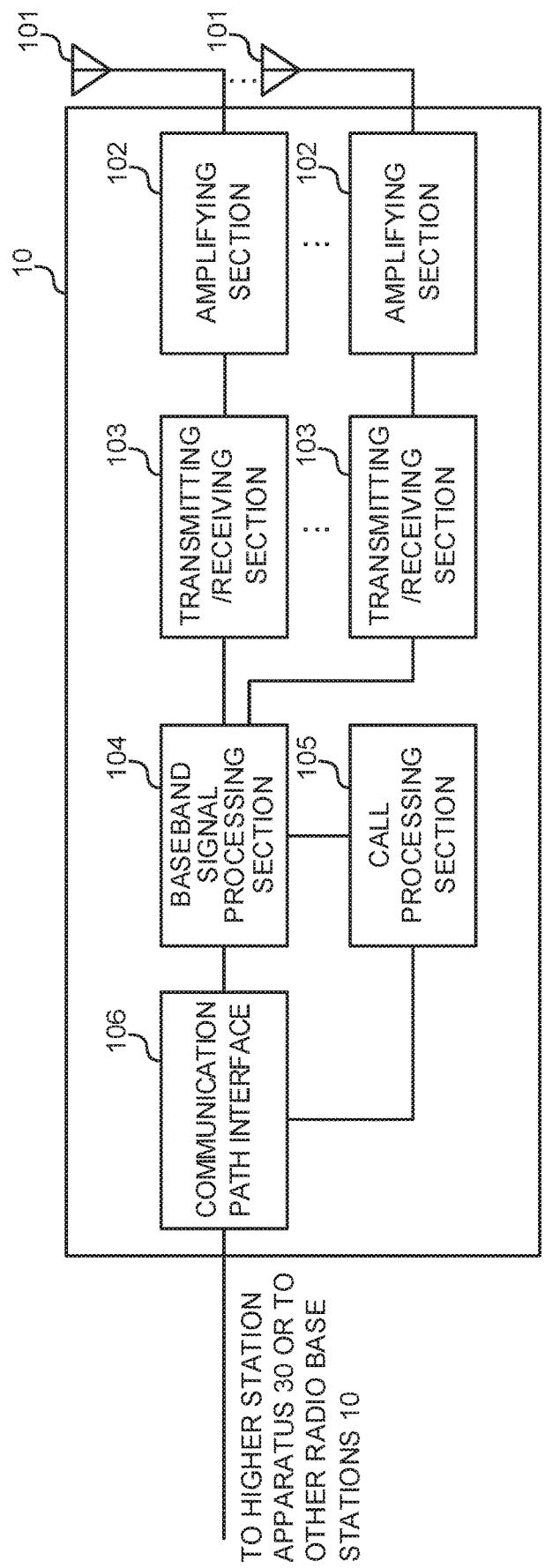
FIG. 7 is a diagram to show an example of an overall structure of a radio base station according to the present embodiment.

FIG. 7 is a diagram to show an example of an overall structure of the radio base station according to one embodiment of the present invention. A radio base station 10 includes a plurality of transmitting/receiving antennas 101, amplifying sections 102, transmitting/receiving sections 103, a baseband signal processing section 104, a call processing section 105 and a transmission line interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the transmission line interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present invention pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the transmission line interface 106. The call processing section 105 performs call processing (setting up, releasing and so on) for communication channels, manages the state of the radio base station 10, manages the radio resources and so on.

The transmission line interface 106 transmits and/or receives signals to and/or from the higher station apparatus 30 via a certain interface. The transmission line interface 106 may transmit and/or receive signals (backhaul signaling) with other radio base stations 10 via an inter-base station interface (for example, an optical fiber in compliance with the CPRI (Common Public Radio Interface) and an X2 interface).

The transmitting/receiving sections 103 receives a demodulation reference signal for an UL channel and/or a PUCCH to which a certain sequence is applied. The transmitting/receiving sections 103 indicates whether or not the frequency hopping is employed (for example, enabled/disabled) and/or conditions for employing a group hopping pattern (for example, neither/enabled/disabled), by using higher layer signaling (for example, cell-specific and/or UE-specific RRC signaling (RRC parameters), a broadcast signal and so on).

Figure 8:
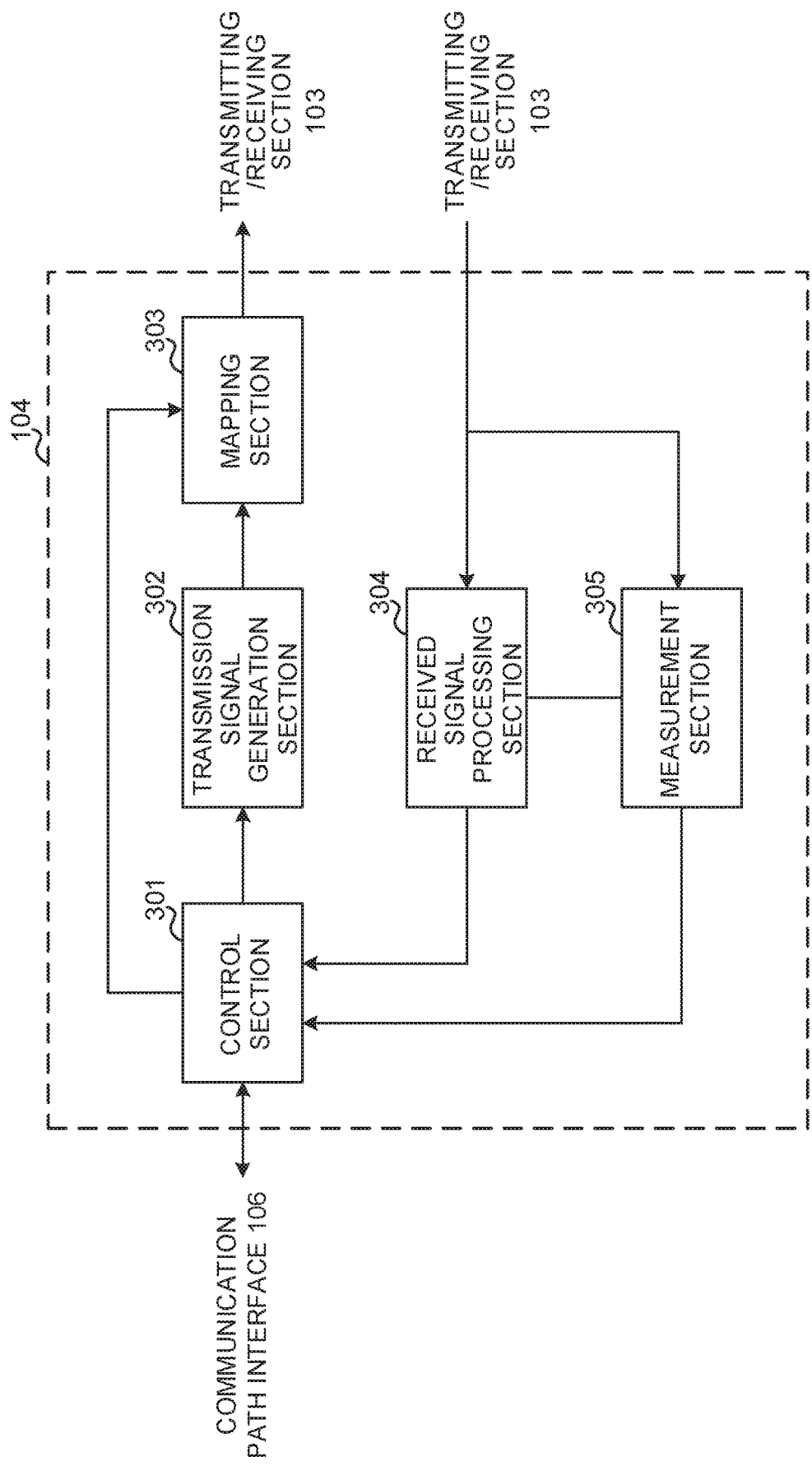
FIG. 8 is a diagram to show an example of a functional structure of the radio base station according to the present embodiment.

FIG. 8 is a diagram to show an example of a functional structure of the radio base station according to one embodiment of the present invention. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present invention pertains.

The control section 301, for example, controls the generation of signals by the transmission signal generation section 302, the mapping of signals by the mapping section 303, and so on. The control section 301 controls the signal receiving processes by the received signal processing section 304, the measurements of signals by the measurement section 305, and so on.

The control section 301 controls scheduling (for example, resource allocation) of system information, a downlink data signal (for example, a signal transmitted on a PDSCH), and a downlink control signal (for example, a signal transmitted on a PDCCH and/or an EPDCCH, delivery confirmation information, and so on). Based on the results of determining necessity or not of retransmission control to the uplink data signal, or the like, the control section 301 controls generation of a downlink control signal, a downlink data signal, and so on. The control section 301 controls the scheduling of a synchronization signal (for example, a PSS (Primary Synchronization Signal)/an SSS (Secondary Synchronization Signal)), a downlink reference signal (for example, a CRS, a CSI-RS, a DMRS), and so on.

The control section 301 controls scheduling of an uplink data signal (for example, a signal transmitted on a PUSCH), an uplink control signal (for example, a signal transmitted on a PUCCH and/or a PUSCH, delivery confirmation information, and so on), a random access preamble (for example, a signal transmitted on a PRACH), an uplink reference signal, and so on, The control section 301 controls whether or not the frequency hopping pattern is employed, conditions for the group hopping pattern, and the like.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present invention pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present invention pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present invention pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), a signal strength (for example, RSSI (Received Signal Strength Indicator)), channel information (for example, CSI), and so on. The measurement results may be output to the control section 301.
<User Terminal>

Figure 9:
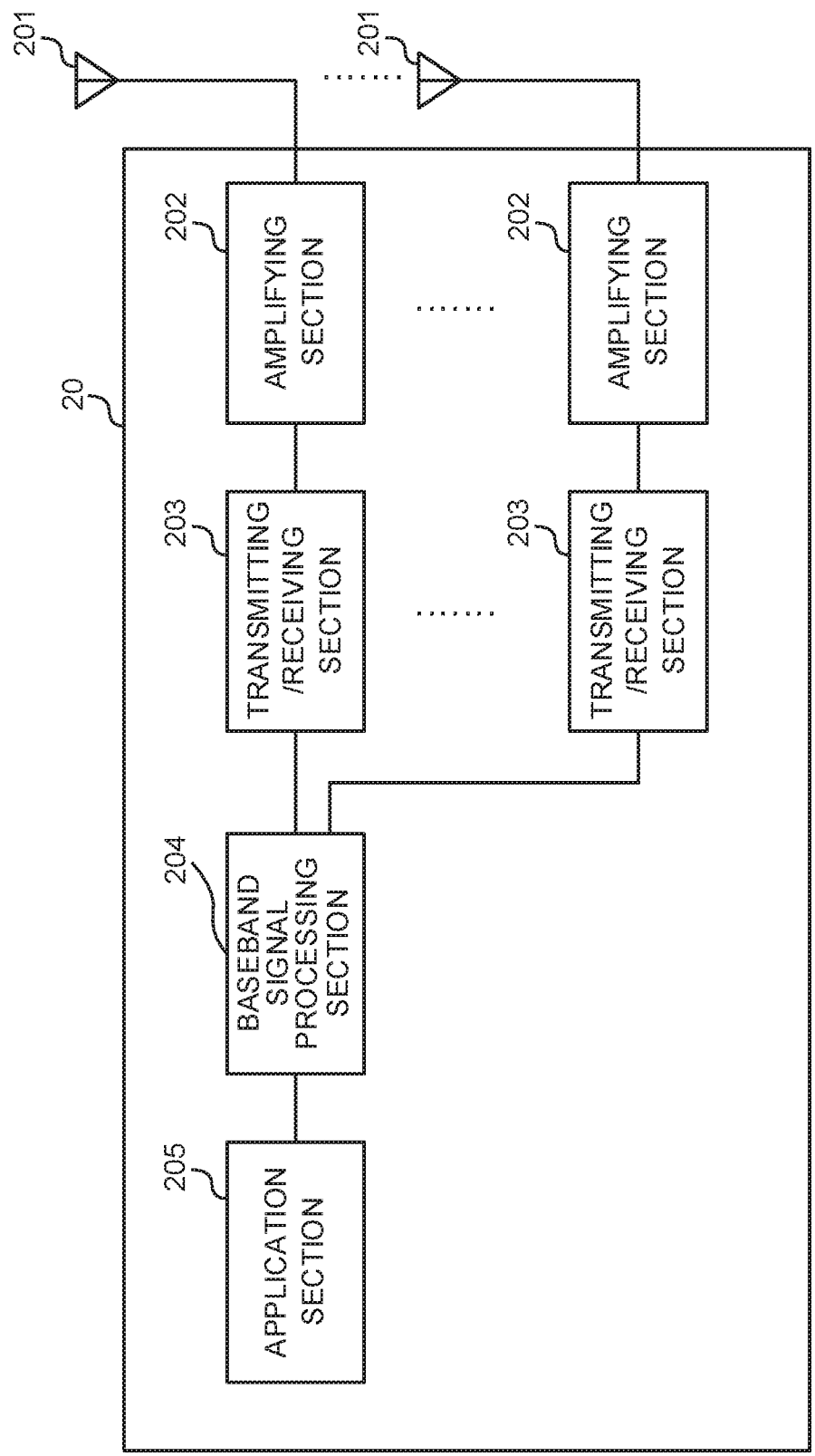
FIG. 9 is a diagram to show an example of an overall structure of a user terminal according to the present embodiment.

FIG. 9 is a diagram to show an example of an overall structure of a user terminal according to one embodiment of the present invention. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present invention pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

The transmitting/receiving sections 203 transmits a demodulation reference signal for an UL channel and/or a PUCCH to which a certain sequence is applied. The transmitting/receiving sections 203 may receive whether or not the frequency hopping is employed (for example, enabled/disabled) and/or conditions for employing a group hopping pattern (for example, neither/enabled/disabled), by using higher layer signaling (for example, cell-specific and/or UE-specific RRC signaling (RRC parameters), a broadcast signal and so on).

Figure 10:
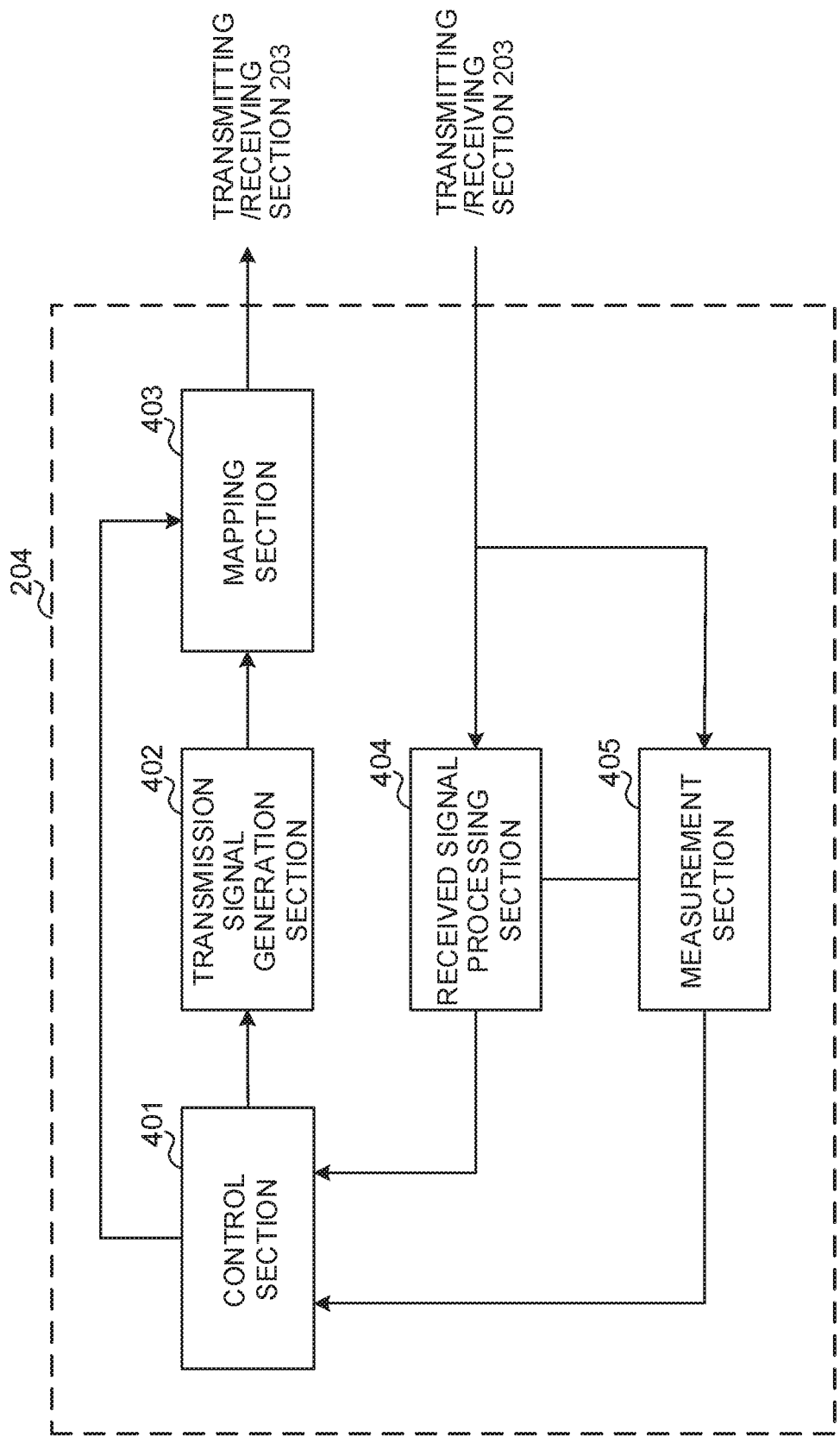
FIG. 10 is a diagram to show an example of a functional structure of the user terminal according to the present embodiment.

FIG. 10 is a diagram to show an example of a functional structure of a user terminal according to one embodiment of the present invention. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present invention pertains.

The control section 401, for example, controls the generation of signals by the transmission signal generation section 402, the mapping of signals by the mapping section 403, and so on. The control section 401 controls the signal receiving processes by the received signal processing section 404, the measurements of signals by the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

The control section 401 selects at least one of a certain sequence applied when frequency hopping is configured and a certain sequence applied when the frequency hopping is not configured out of a plurality of certain sequences obtained on the basis of at least a frequency hopping index in each slot.

The control section 401 may select the certain sequence applied when the frequency hopping is not configured from a plurality of certain sequences applied when the frequency hopping is configured. The control section 401 may set the certain sequence obtained on the basis of a specific frequency hopping index as the certain sequence applied when the frequency hopping is not configured.

The control section 401 may select the certain sequence applied to each frequency hopping on the basis of a symbol index when the frequency hopping is configured.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present invention pertains.

For example, the transmission signal generation section 402 generates an uplink control signal about delivery confirmation information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present invention pertains. The received signal processing section 404 can constitute the receiving section according to the present invention.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present invention pertains.

For example, the measurement section 405 may perform RRM measurement, CSI measurement, and so on, based on the received signal. The measurement section 405 may measure a received power (for example, RSRP), a received quality (for example, RSRQ, SINR), a signal strength (for example, RSSI), channel information (for example, CSI), and so on. The measurement results may be output to the control section 401.

<Hardware Structure>

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 11:
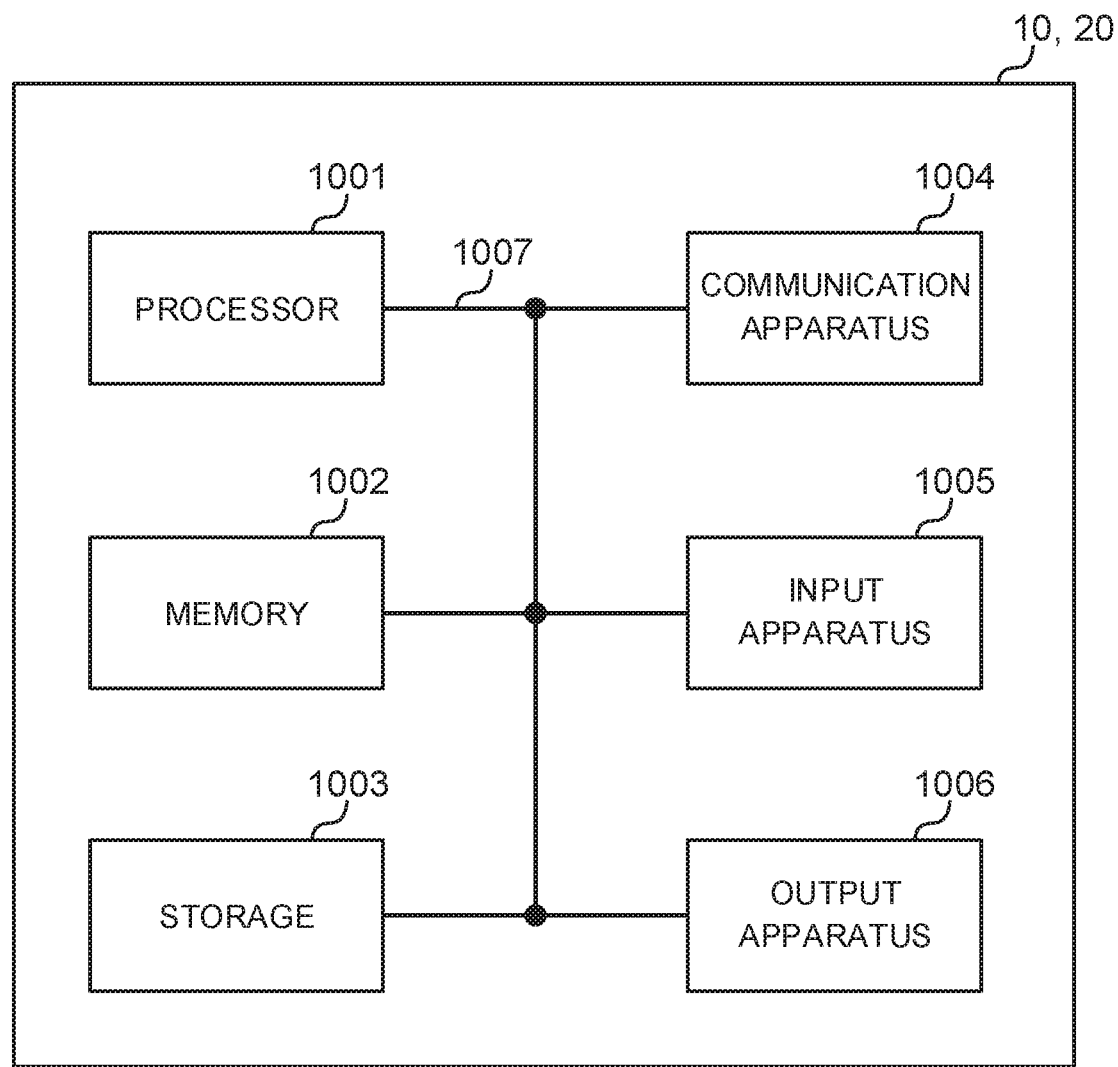
FIG. 11 is a diagram to show an example of a hardware structure of the radio base station and the user terminal according to the present embodiment.

For example, a radio base station, a user terminal, and so on according to one embodiment of the present invention may function as a computer that executes the processes of the radio communication method of the present invention. FIG. 11 is a diagram to show an example of a hardware structure of the radio base station and the user terminal according to one embodiment of the present invention. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control reading and/or writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present invention.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via a wired and/or wireless network, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), transmission line interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology described in this specification and/or the terminology that is needed to understand this specification may be replaced by other terms that convey the same or similar meanings. For example, "channels" and/or "symbols" may be "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI" or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks, and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to certain values, or may be represented in another corresponding information. For example, radio resources may be specified by certain indices.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names allocated to these various channels and information elements are in no respect limiting.

The information, signals, and so on described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers, and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" used in this specification can be used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up, (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions and/or (both visible and invisible) optical regions, or the like.

In this specification, the phrase "A and B are different" may mean that "A and B are different from each other." The terms "separate," "be coupled" and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described in this specification. The present invention can be implemented with various corrections and in various modifications, without departing from the spirit and scope of the present invention defined by the recitations of claims. Consequently, the description in this specification is provided only for the purpose of explaining examples, and should by no means be construed to limit the present invention in any way.

The invention claimed is:

1. A terminal comprising:
    a processor that, if group hopping of a sequence used in an uplink control channel is enabled, determines a group number based on a slot number and a frequency hopping index; and
    a transmitter that transmits the uplink control channel, to which the sequence corresponding to the group number is applied.

2. The terminal according to claim 1, wherein if the group hopping is disabled, the processor determines the group number based on another index that is different from the frequency hopping index.

3. The terminal according to claim 1, wherein if the group hopping is neither enabled nor disabled, the processor determines the group number based on another index that is different from the frequency hopping index.

4. The terminal according to claim 1, wherein if frequency hopping is configured, then the processor applies a first frequency hopping index value, as a value of the frequency hopping index, to a first hop, and applies a second frequency hopping index value, as the value of the frequency hopping index, to a second hop.

5. The terminal according to claim 4, wherein if frequency hopping is not configured, then the processor applies the first frequency hopping index value as the value of the frequency hopping index.

6. A radio communication method for a terminal comprising:

if group hopping of a sequence used in an uplink control channel is enabled, determining a group number based on a slot number and a frequency hopping index; and transmitting the uplink control channel, to which the sequence corresponding to the group number is applied.

7. A base station comprising:

a transmitter that transmits information regarding a configuration of group hopping of a sequence that is used in an uplink control channel; and a processor that, if the group hopping is enabled, controls reception of the uplink control channel, to which the sequence is applied, wherein the sequence corresponds to a group number, and the group number is determined based on a slot number and a frequency hopping index.

8. A system comprising a terminal and a base station, wherein:

the terminal comprises:

a first processor that, if group hopping of a sequence used in an uplink control channel is enabled, determines a group number based on a slot number and a frequency hopping index; and a transmitter that transmits the uplink control channel, to which the sequence corresponding to the group number is applied;

the base station comprises:

a second processor that, if the group hopping is enabled, controls reception of the uplink control channel, to which the sequence is applied.

* * * * *